United States Patent
Li et al.

(10) Patent No.: US 11,781,614 B2
(45) Date of Patent: Oct. 10, 2023

(54) SYSTEM FOR TRANSMITTING A FLEXURAL WAVE FROM ONE STRUCTURE TO ANOTHER BY IMPEDANCE MATCHING

(71) Applicant: Toyota Motor Engineering & Manufacturing North America, Inc., Plano, TX (US)

(72) Inventors: Xiaopeng Li, Ann Arbor, MI (US); Ziqi Yu, Ann Arbor, MI (US); Taehwa Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 173 days.

(21) Appl. No.: 17/397,084

(22) Filed: Aug. 9, 2021

(65) Prior Publication Data

US 2023/0042380 A1    Feb. 9, 2023

(51) Int. Cl.
*F16F 15/02*    (2006.01)
*E04B 1/18*     (2006.01)

(52) U.S. Cl.
CPC .............. *F16F 15/02* (2013.01); *E04B 1/185* (2013.01)

(58) Field of Classification Search
CPC .......... F16F 15/02; F16F 7/1005; F16F 7/104; E04H 9/0215; E04H 9/0237; E04H 9/021; E04H 9/0235; E04B 1/185
See application file for complete search history.

(56) References Cited

U.S. PATENT DOCUMENTS

| 4,635,892 A * | 1/1987 | Baker ................... E04H 9/0215 52/167.2 |
| 6,116,389 A * | 9/2000 | Allaei ..................... F16F 15/02 123/192.1 |

(Continued)

FOREIGN PATENT DOCUMENTS

| JP | 2006207749 A | 8/2006 |
| JP | 2016109283 A | 6/2016 |

OTHER PUBLICATIONS

Chen et al., "Enhanced flexural wave sensing by adaptive gradient-index metamaterials," Scientific Reports 6, rticle No. 35048 (2016), pp. 1-11.

(Continued)

*Primary Examiner* — Brian E Glessner
*Assistant Examiner* — Daniel J Kenny
(74) *Attorney, Agent, or Firm* — Christopher G. Darrow; Darrow Mustafa PC

(57) ABSTRACT

Described is a system for transmitting a flexural wave acting on one structure to another structure. In one example, a system includes a first structure having a first property and a first end and a second structure having a second property and a second end connected to the first end of the first structure. The first property is different from the second property and may be related to the material and/or geometric properties of the first and second structures. A mechanical resonator is connected to the first structure at a distance from the first end of about a quarter-wavelength of the frequency of a flexural wave acting on the first structure. The mechanical resonator matches a first mechanical impedance of the first structure to a second mechanical impedance of the second structure to allow high transmission of the flexural wave acting on the first structure to the second structure.

18 Claims, 2 Drawing Sheets

(56) References Cited

U.S. PATENT DOCUMENTS

| | | | | |
|---|---|---|---|---|
| 6,666,108 B1* | 12/2003 | Alleai | ............... | F16F 7/10 |
| | | | | 123/192.1 |
| 6,826,285 B2 | 11/2004 | Azima | | |
| 6,898,948 B2* | 5/2005 | Roelke | ............... | F04C 18/16 |
| | | | | 62/505 |
| 6,954,686 B2* | 10/2005 | Aubourg | ............... | F16F 7/10 |
| | | | | 701/3 |
| 7,999,402 B2* | 8/2011 | Freeland | ............... | H02K 35/04 |
| | | | | 290/1 R |
| 8,261,492 B2* | 9/2012 | Aldraihem | ............... | E04B 1/98 |
| | | | | 264/105 |
| 8,354,778 B2* | 1/2013 | Arnold | ............... | H02K 7/1892 |
| | | | | 310/370 |
| 2022/0051650 A1* | 2/2022 | Lee | ............... | G10K 11/172 |
| 2022/0106805 A1* | 4/2022 | Nörenberg | ............... | E04B 2/90 |

OTHER PUBLICATIONS

Julien Leng, "Controlling Flexural Waves using Subwavelength Perfect Absorbers: application to Acoustic Black Holes," PhD diss., Universite du Maine, 2019, 145 pages.
Viana et al., "Multimodal Vibration Damping Through Piezoelectric Patches and Optimal Resonant Shunting Circuits," Journal of the Brazilian Society of Mechanical Sciences and Engineering 28, No. 3 (2006): 293-310.

\* cited by examiner

SYSTEM FOR TRANSMITTING A FLEXURAL WAVE FROM ONE STRUCTURE TO ANOTHER BY IMPEDANCE MATCHING

TECHNICAL FIELD

The subject matter described herein relates, in general, to systems for transmitting one or more flexural waves from one structure to another by impedance matching.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some mechanical structures, such as beams, are designed to support lateral loads. In doing so, the displacement is predominantly transverse to the centerline, and internal shear forces and bending moments are generated. This dynamic behavior of beams is called flexural motion in the form of flexural waves. Flexural waves can deform a structure transversely as the flexural waves propagate. These waves are more complicated than compressional or shear waves and depend on the material properties and geometric properties of the structures they are acting upon. Flexural waves are also dispersive since different frequencies travel at different speeds.

Flexural waves can move from one structure to another when the two structures are in contact with one another and have matching mechanical impedances. However, when the impedances of the structures are different, flexural waves might be partially or totally reflected when reaching a terminal end of one structure instead of being totally transmitted to the other structure

SUMMARY

This section generally summarizes the disclosure and does not comprehensively explain its full scope or all its features.

In one example, a system includes a first structure having a first property and a first end and a second structure having a second property and a second end connected to the first end of the first structure. The first property, such as bending stiffness, is different from the second property and may be related to the material and/or geometric properties of the first and second structures. A mechanical resonator is connected to the first structure at a distance from the first end of about a quarter-wavelength of a flexural wave acting on the first structure. The mechanical resonator matches a first mechanical impedance of the first structure to a second mechanical impedance of the second structure to allow high transmission of the flexural wave acting on the first structure to the second structure.

In another example, a system can transmit two or more flexural waves acting on one structure to another structure. This system may include a first structure having a first property and a first end and a second structure having a second property and a second end connected to the first end of the first structure. Like before, the first property is different from the second property and may be related to the material and/or geometric properties of the first and second structures.

This system includes a first mechanical resonator connected to the first structure at a first distance from the first end of about a quarter-wavelength of a first flexural wave acting on the first structure and a second mechanical resonator connected to the first structure at a second distance from the first end being about a quarter-wavelength of a second flexural wave acting on the first structure. The first and second mechanical resonators match a first mechanical impedance of the first structure to a second mechanical impedance of the second structure to allow transmission of the first and second flexural waves acting on the first structure to the second structure.

In yet another example, a system includes a first structure having a first property and a first end and a second structure having a second property and a second end connected to the first end of the first structure. Again, the first property is different from the second property and may be related to the material and/or geometric properties of the first and second structures. In this example, the system includes an N-number of mechanical resonators connected to the first beam at N-distances from the first end. The N-distances being about quarter-wavelengths of the frequencies of the N-flexural waves acting on the first beam. The N-number of mechanical resonators have a resonance frequency substantially similar to one of the N-flexural waves acting on the first beam. The N-number of mechanical resonators match a first mechanical impedance of the first beam to a second mechanical impedance of the second beam to allow transmission of the N-flexural waves acting on the first beam to the second beam.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described herein is a system for transmitting flexural waves from one structure to another. The structures may each be in the form of beams having ends that contact one another. The structures may have different properties, such as different geometric or material properties, causing them to have different mechanical impedances. Normally, a flexural wave acting on one structure would mostly be reflected after reaching the end of the structure, and only a small amount, if any, would be transmitted to the abutting other structure. The system allows for transmitting flexural waves from one structure to another by impedance matching the structures with each other. This is achieved by placing a mechanical resonator at a distance from the end of the structure that the flexural wave is acting on. The distance may be about a quarter-wavelength of the frequency of the flexural wave acting on the structure. The mechanical resonator may have a resonance frequency substantially similar to the frequency of the flexural wave acting on the structure. Additionally, if multiple flexural waves of different frequencies are acting on a structure, the system can be modified to transmit these multiple flexural waves by using multiple mechanical resonators at multiple distances from the end of the structure having the multiple flexural waves acting thereon.

Figure 1:
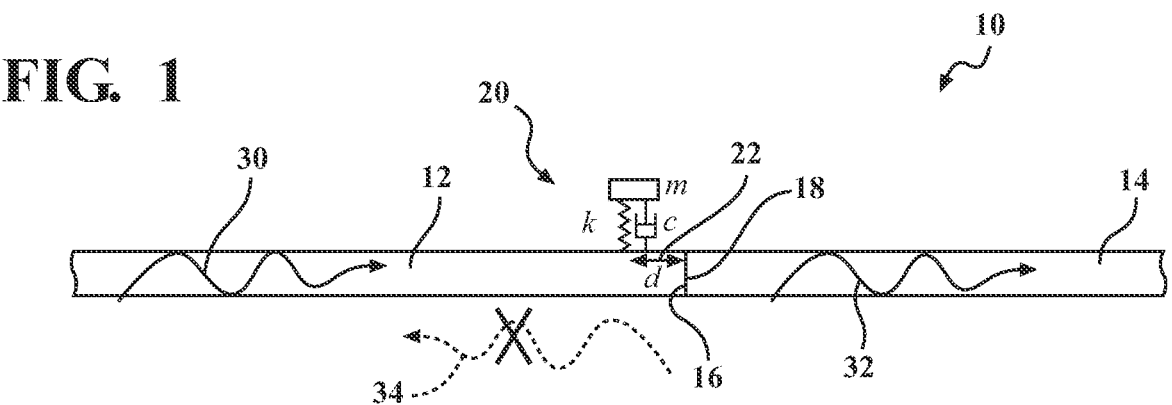
FIG. 1 illustrates a system for transmitting flexural waves from one structure to another having different properties by matching the mechanical impedances of the structures using a mechanical resonator.

Referring to FIG. 1, a system 10 for transmitting flexural waves from one structure to another is shown. Here, the system 10 includes a first structure 12 and a second structure 14. In this example, the first structure 12 and the second structure 14 are in the form of beams. The first structure 12 has an end 16 that may be a terminal end, while the second structure 14 may have an end 18 that may also be a terminal end. Generally, the end 16 and the end 18 are in direct physical contact with one another. As such, the end 16 essentially abuts the end 18.

Figure 2A:
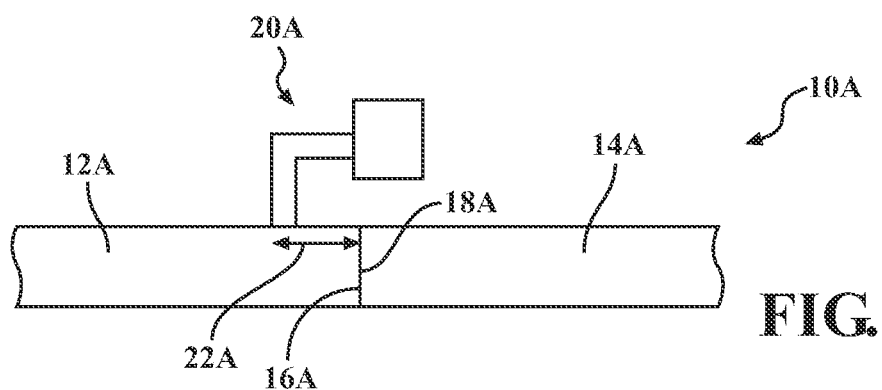
FIGS. 2A-2C illustrate examples of the structures of FIG. 1 having different material and/or geometric properties.

The first structure 12 and the second structure 14 may have different properties. These properties can include material properties and/or geometric properties. For example, referring to FIG. 2A, illustrated in this example, is a system 10A having a first structure 12A and a second structure 14A. For the sake of simplicity, like reference numerals have been utilized to refer to like elements, with the exception that the letter "A" has been added to the end of the reference numeral. As such, any description of related elements anywhere in this disclosure is equally applicable to these elements as well.

Here, the first structure 12A and the second structure 14A have similar geometric properties. For example, the thicknesses of the first structure 12A and the second structure 14A may be similar. However, in this example, the first structure 12A is made of one type of material, while the second structure 14A is made out of a different type of material. For example, the first structure 12A could be made out of aluminum, while the second structure 14A could be made out of silicone. Because of this difference in material properties making up the first structure 12A and the second structure 14A, the mechanical impedance for each structure is different. It should be understood that the examples of aluminum and silicone and are merely examples, and the first structure 12A and/or the second structure 14A can be made of any type of material.

Figure 2B:
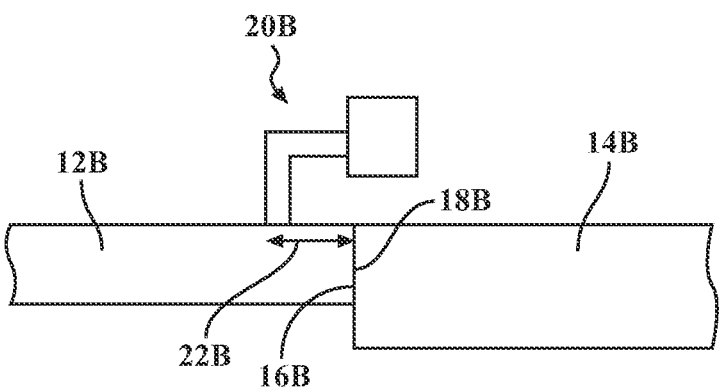

Similarly, referring to FIG. 2B, shown as an example of the system 10B, having a first structure 12B and a second structure 14B. Like before, like reference numerals have been utilized to refer to like elements. Unlike the example shown in FIG. 2A, the first structure 12B and the second structure 14B are made of the same material, for example, aluminum. However, while the material properties are the same, the geometric properties of the first structure 12B and the second structure 14B are different. Namely, in this example, the thickness of the second structure 14B is greater than the thickness of the first structure 12B. This difference in geometric properties means that the first structure 12B has a different mechanical impedance compared to the second structure 14B.

Figure 2C:
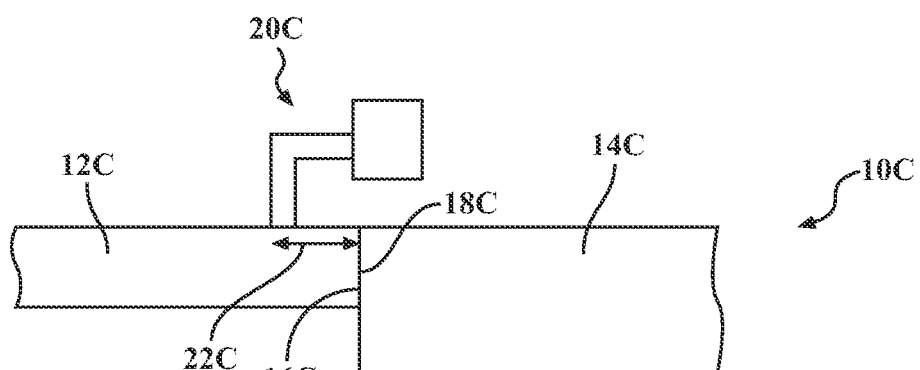

In some cases, both the material and geometric properties of the structures may be different. For example, referring to FIG. 2C, shown is a system 10C having a first structure 12C and a second structure 14C having both different material and geometric properties. Again, like before, like reference numerals have been utilized to refer to like elements. In this example, the first structure 12C and the second structure 14C are made of different materials, for example, one could be made of aluminum while the other is made of silicone. Additionally, the second structure 14C is thicker than the first structure 12C, thus indicating a difference in geometric properties as well. These differences in geometric and/or material properties cause the first structure 12C to have a different mechanical impedance from the second structure 14C.

Returning back to FIG. 1, this example is similar to the example shown in FIG. 2C, wherein the first structure 12 and the second structure 14 have similar geometric properties but are made of different types of materials, such as aluminum and silicone, respectively. As explained previously, a flexural wave 30 acting upon the first structure 12 would be mostly reflected upon reaching the end 16 of the first structure 12. However, the system 10 also includes a mechanical resonator 20 located at a distance (d) 22 as measured from the end 16 of the first structure 12.

The mechanical resonator 20 is generally configured to match the mechanical impedance of the first structure 12 to the mechanical impedance of the second structure 14 to allow high transmission of the flexural wave 30 acting upon the first structure 12. The mechanical resonator 20 may be any type of mechanical resonator that can be simplified as a mass-spring-damper system. In one example, the mechanical resonator 20 may be a cantilever-like beam resonator, such as shown in FIG. 2A-2C. The mechanical resonator 20 generally has a resonance frequency substantially similar to the frequency of the flexural wave 30 acting upon the first structure 12. In this case, "substantially similar" may be 80% to 120% of the frequency of the flexural wave 30 acting upon the first structure 12.

As to the distance (d) 22, the distance (d) 22 is generally about a quarter-wavelength of a flexural wave acting on the first structure. In this example, "about" may be 80% to 120% of the length of the quarter-wavelength of the flexural wave 30 acting upon the first structure 12. When configured as described above and shown in FIG. 1, the mechanical impedance of the first structure 12 substantially matches the mechanical impedance of the second structure 14. "Substantially" in this example may be 80% to 120% of the mechanical impedances of one structure to another. When configured as described above, the system allows for the transmission of the flexural wave 30 from the first structure 12 to the second structure 14, shown as the transmitted flexural wave 32. This avoids the issue where the flexural wave 30 is reflected, as shown by the reflected flexural wave 34.

The wavelength (λ) of a particular flexural wave may be calculated using the following equation:

$$\lambda = 2\pi/k, \tag{1}$$

where k is the wavenumber which is the spatial frequency of a wave measured in cycles per unit distance or radians per unit distance. As such, the distance (d) 22 is inversely proportional to the frequency of the flexural wave to be transmitted from the first structure 12 to the second structure 14. So, as the frequency of the flexural wave increases, the distance (d) 22 decreases.

FIG. 1 illustrates a system 10 that can match the impedance of two different structures to transmit a flexural wave 30 acting on one structure to another structure. However, the system 10 has certain limits in that the mechanical resonator 20 and the distance (d) 22 are based on the frequency of the flexural wave 30 acting upon the first structure 12. If the flexural wave 30 had a different frequency, the resonance frequency of the mechanical resonator 20 and the distance (d) 22 would need to be adjusted.

Figure 3:
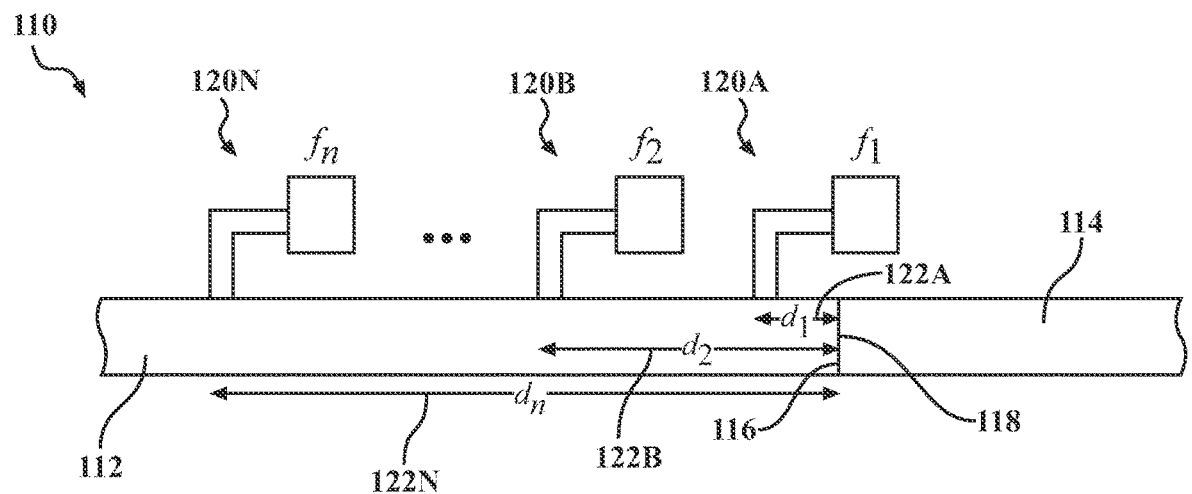
FIG. 3 illustrates a system for transmitting multiple flexural waves of different frequencies from one structure to another having different properties.

Nevertheless, broadband impedance matching and transmission of different flexural waves acting upon a first structure is still possible. For example, FIG. 3 illustrates a system 110 that allows for the broadband transmission of different flexural waves having different frequencies acting on a structure. The system 110 is similar to the system 10 and therefore utilizes like reference numerals to refer to like elements, with the exception of the reference numerals of FIG. 3 have been incremented by one-hundred. Any descriptions regarding the system 10 are equally applicable to the like elements of the system 110.

To achieve broadband impedance matching and therefore transmission of flexural waves of different frequencies, the system 110 utilizes multiple mechanical resonators 120A, 120B, . . . 120N. Any number of mechanical resonators (N-number of mechanical resonators) can be utilized. Each of the multiple mechanical resonators 120A, 120B, . . . 120N are connected to the first structure 112 at different distances 122A, 122B, . . . 122N (N-number of distances), respectively, measured from the first end 116 of the first structure 112.

Like before, the mechanical resonators 120A, 120B, . . . 120N may be any type of mechanical resonator that may be simplified as a mass-spring-damper system, such as cantilever-like beam resonators. The resonance frequencies of mechanical resonators 120A, 120B, . . . 120N are substantially similar to the frequencies of flexural waves acting upon the first structure 112. "Substantially similar" may be 80% to 120% of the frequencies of the flexural waves acting upon the first structure 112.

As to the distances 122A, 122B, . . . 122N for the mechanical resonators 120A, 120B, . . . 120N, respectively, are generally about quarter-wavelengths the flexural waves acting on the first structure 112. In this example, "about" may be 80% to 120% of the lengths of the quarter-wavelengths of the flexural waves acting upon the first structure 112. As such, the system 110 allows for the high transmission of multiple flexural waves having different frequencies acting upon the first structure 112 to the second structure 114.

Figure 4:
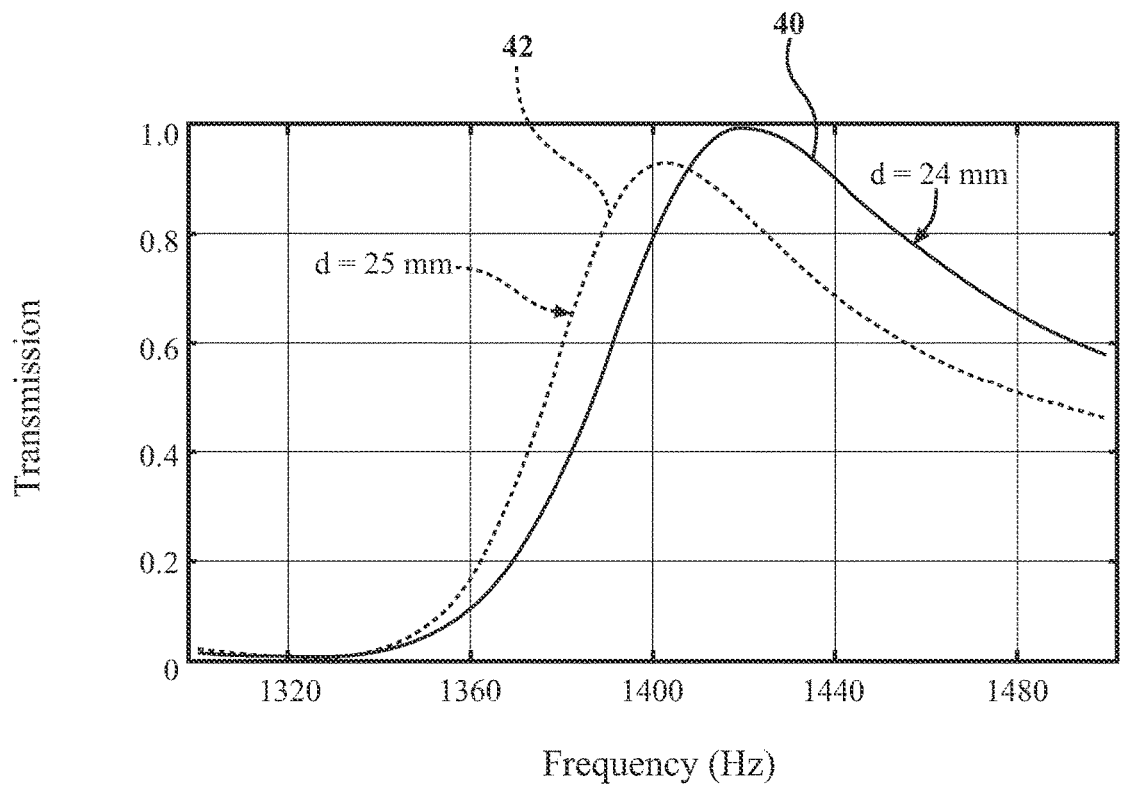
FIG. 4 is a chart illustrating the overall transmission of a flexural wave from one structure to another using the system for transmitting flexural waves.

As noted in the examples above, the system 10 and/or the system 110 allow for the high transmission of flexural waves acting upon one structure to another structure. FIG. 4 illustrates a chart showing the transmission of a flexural wave acting on the first structure 12 of the system 10 of FIG. 1. In this example, the first structure 12 is made of aluminum, while the second structure 14 is made of silicone. As such, the first structure 12 has a different material property and, therefore, has a different mechanical impedance than the second structure 14. The first structure 12 may have a density of 2700 kg/m$^3$, a Young's modulus of 70 GPa, a Poisson's ratio of 0.33, a thickness of 2 mm, and a width of 25.4 mm. The second structure 14 may have a density of 1100 kg/m$^3$, a Young's modulus of 6.25 MPa, a Poisson's ratio of 0.49, a thickness of 2 mm, and a width of 25.4 mm. The mass-spring resonator has an effective mass of 1.8 g and an effective spring constant of 110.46 kN/m.

Here, illustrated is the transmission of the flexural wave 30 acting upon the first structure 12 to the second structure 14. When the distance (d) 22 is approximately 24 mm, as indicated by line 40, the chart indicates a near-complete transmission of a flexural wave from the first structure 12 to the second structure 14 when the flexural wave has a frequency of 1420 Hz. Adjusting the distance (d) 22 can impact the transmission of the flexural wave acting on the first structure 12 to the second structure 14. Moreover, when the distance (d) 22 is approximately 25 mm, as indicated by line 42, the chart shows a reduced transmission of a flexural wave having a frequency of 1420 Hz. Nevertheless, this arrangement still shows high transmission (more than 80%) of a flexural wave of approximately 1400 Hz from the first structure 12 to the second structure 14.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The terms "a" and "an," as used herein, are defined as one or more than one. The term "plurality," as used herein, is defined as two or more than two. As used herein, the term "another" is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
    a first structure having a length extending in a first direction and having a first property and a first end that extends in a second direction and forms a first distal end face;
    a second structure having a length extending in the first direction and having a second property and a second end that extends in the second direction and forms a second distal end face, wherein the first distal end face abuts the second distal end face;
    the first property being different from the second property; and
    a mechanical resonator connected to the first structure at a distance from the first end, the distance being about a quarter-wavelength of a flexural wave acting on the first structure.

2. The system of claim 1, wherein the first property and the second property are at least one of a material property and a geometric property.

3. The system of claim 2, wherein the first structure is made of a first material and the second structure is made of a second material, the first material having different material properties than the second structure.

4. The system of claim 1, wherein the mechanical resonator is configured to match a first mechanical impedance of the first structure to a second mechanical impedance of the second structure to allow high transmission of the flexural wave acting on the first structure to the second structure.

5. The system of claim 1, wherein the first structure is a first beam and the second structure is a second beam.

6. The system of claim 5, wherein a thickness of the first beam is different than a thickness of the second beam.

7. The system of claim 1, wherein the mechanical resonator has a resonance frequency substantially similar to a frequency of the flexural wave acting on the first structure.

8. The system of claim 1, wherein the mechanical resonator is a cantilever-like beam resonator.

9. A system comprising:
a first structure having a first property and a first end;
a second structure having a second property and a second end connected to the first end of the first structure;
the second property being different from the first property;
a first mechanical resonator connected to the first structure at a first distance from the first end, the first distance being about a quarter-wavelength of a first flexural wave acting on the first structure, the first mechanical resonator has a first resonance frequency substantially similar to a frequency of the first flexural wave acting on the first structure;
a second mechanical resonator connected to the first structure at a second distance from the first end, the second distance being about a quarter-wavelength of a second flexural wave acting on the first structure, the second mechanical resonator has a second resonance frequency substantially similar to the frequency of the second flexural wave acting on the first structure;
the first resonance frequency is greater than the second resonance frequency; and
the second distance is greater than the first distance.

10. The system of claim 9, wherein the first property and the second property are at least one of a material property and a geometric property.

11. The system of claim 10, wherein the first structure is made of a first material and the second structure is made of a second material, the first material having different material properties than the second structure.

12. The system of claim 9, wherein:
the first mechanical resonator is configured to match a first mechanical impedance of the first structure to a second mechanical impedance of the second structure to allow high transmission of the first flexural wave acting on the first structure to the second structure; and
the second mechanical resonator is configured to match the first mechanical impedance of the first structure to the second mechanical impedance of the second structure to allow high transmission of the second flexural wave acting on the first structure to the second structure.

13. The system of claim 9, wherein the first structure is a first beam and the second structure is a second beam.

14. The system of claim 13, wherein a thickness of the first beam is different than a thickness of the second beam.

15. The system of claim 9, wherein the first mechanical resonator and the second mechanical resonator are cantilever-like beam resonators.

16. A system comprising:
a first beam having a length extending in a first direction and having a first property and a first end that extends in a second direction and forms a first distal end face;
a second beam having a length extending in the first direction and having a second property and a second end that extends in the second direction and forms a second distal end face, wherein the first distal end face abuts the second distal end face;
the first property being different from the second property, the first property and the second property are at least one of a material property and a geometric property;
an N-number of mechanical resonators connected to the first beam at N-distances from the first end, the N-distances being about quarter-wavelengths of N-flexural waves acting on the first beam; and
the N-number of mechanical resonators each have a resonance frequency substantially similar to a frequency of one of the N-flexural waves acting on the first beam.

17. The system of claim 16, wherein the distances from the first end that the N-number of mechanical resonators are connected to are based on frequencies of the N-flexural waves acting on the first beam.

18. The system of claim 16, wherein the N-number of mechanical resonators are configured to match a first mechanical impedance of the first beam to a second mechanical impedance of the second beam to allow high transmission of the N-flexural waves acting on the first beam to the second beam.

* * * * *